(12) United States Patent
Tsao et al.

(10) Patent No.: US 9,962,890 B2
(45) Date of Patent: May 8, 2018

(54) PROCESSING METHOD FOR LENS FILM

(71) Applicants: SHUOYAN OPTICS LIMITED COMPANY., Taipei (TW); Han-Wei Tsao, Taoyuan (TW); Tung-Yen Wu, Taipei (TW)

(72) Inventors: Han-Wei Tsao, Taoyuan (TW); Tung-Yen Wu, Taipei (TW)

(73) Assignees: SHUOYAN OPTICS LIMITED COMPANY, Taipei (TW); Han-Wei Tsao, Taoyuan (TW); Tung-Yen Wu, Taipei (TW)

( * ) Notice: Subject to any disclaimer, the term of this patent is extended or adjusted under 35 U.S.C. 154(b) by 209 days.

(21) Appl. No.: 15/063,659

(22) Filed: Mar. 8, 2016

(65) Prior Publication Data
US 2017/0028656 A1  Feb. 2, 2017

(30) Foreign Application Priority Data
Jul. 29, 2015  (TW) .............................. 104124491 A

(51) Int. Cl.
*B29D 11/00* (2006.01)
*G02B 1/10* (2015.01)
(Continued)

(52) U.S. Cl.
CPC .... *B29D 11/00009* (2013.01); *B29D 11/0073* (2013.01); *B29D 11/00442* (2013.01);
(Continued)

(58) Field of Classification Search
None
See application file for complete search history.

(56) References Cited

U.S. PATENT DOCUMENTS

| | | | | |
|---|---|---|---|---|
| 4,865,670 A | * | 9/1989 | Marks | B29D 11/00865 156/212 |
| 4,927,480 A | * | 5/1990 | Vaughan | B29D 11/0073 156/228 |

(Continued)

FOREIGN PATENT DOCUMENTS

| CN | 202186960 | 4/2012 |
|---|---|---|
| CN | 103885113 | 6/2014 |

OTHER PUBLICATIONS

Agilent, "High and Ultra-High Vacuum for Science and Research", Seminar Handbook, Sep. 2011, 136 pages. (Year: 2011).*

(Continued)

*Primary Examiner* — Lisa L Herring
(74) *Attorney, Agent, or Firm* — Jackson IPG PLLC; Demian K. Jackson

(57) ABSTRACT

A processing method for a lens film is provided. The lens includes a master slice and a base plate. The processing method includes: performing a shaping process on the base plate to form a curvature; performing a cleaning process to form a microstructure on a surface of the master slice; applying a fixed amount of adhesive between the base plate and the master slice, performing a pressing operation on the base plate and the master slice by the mold to form a lens; and performing a curing process on the lens to complete the processing of the lens film. Thus, an optimal attaching effect that the lens is attached without air bubbles and wrinkles can be achieved.

10 Claims, 2 Drawing Sheets

(51) Int. Cl.
*G02C 7/12* (2006.01)
*B29K 69/00* (2006.01)

(52) U.S. Cl.
CPC ............ *G02B 1/10* (2013.01); *B29K 2069/00* (2013.01); *B29K 2995/0034* (2013.01); *G02C 7/12* (2013.01)

(56) References Cited

U.S. PATENT DOCUMENTS

| | | | | |
|---|---|---|---|---|
| 6,562,466 | B2* | 5/2003 | Jiang | B29C 63/16 |
| | | | | 156/228 |
| 2005/0243274 | A1* | 11/2005 | Chou | B29D 11/0073 |
| | | | | 351/159.56 |
| 2008/0094702 | A1* | 4/2008 | Mizuno | B29D 11/0073 |
| | | | | 359/485.03 |
| 2011/0194179 | A1 | 8/2011 | Hsu | |
| 2012/0013980 | A1* | 1/2012 | Begon | B29C 63/16 |
| | | | | 359/465 |

OTHER PUBLICATIONS

Chinese Office Action for Application No. 201510526925.4, dated Nov. 16, 2017.

\* cited by examiner

PROCESSING METHOD FOR LENS FILM

BACKGROUND OF THE INVENTION a) Field of the Invention

The invention relates in general to a processing method for a lens film, and more particular to a processing method for attaching a film having optical properties onto a surface of a lens. A master slice has a surface formed with a microstructure during a cleaning process, and is pressed with a base plate having a curvature in a mold to form a lens with optical properties, thereby achieving advantages of attaching the master slice and the base plate with no bubbles in between, optimal wrinkle-free attaching effects and outstanding optical properties.

b) Description of the Prior Art

In current conventional eyeglass lenses, apart from basic configurations of plain mirrors, convex lenses and concave lenses. To append other optical effects, a film layer capable of producing expected optical effects may be additional attached or coated onto a lens. Such additional film layer may be a polarizing film, a color filter film or a lens protecting film. For example, a lens having a surface attached with a polarizing film becomes a polarizing lens. The function of the polarizing film is equivalent to blinds used for a window, and effectively blocks horizontal light rays while allowing only vertical light rays to pass through. As light rays can only move forward along the same direction, such light rays are referred to as polarized light rays. A polarizing lens mainly eliminates glare coming from all directions, and effectively increases the clarity of vision to reduce eye fatigue and dryness, thereby bringing better visual effects and quality. Thus, polarized lenses are extensively applied in are numerous structures including camera equipments and apparatus panels.

A manufacturing process of a conventional polycarbonate (PC) polarized lens is taken as an example. A shaping process is performed on a polarized film (to be referred to as a base plate), which is then cut. The cut base plate is placed in a mold of an injection molding machine, and a heated PC material in a molten state in injected and combined with the base plate. After cooling and removal from the mold, steps of cleaning, coloring and reinforcing are performed. An inspection step for the lens quality is then performed to complete the manufacturing process of the PC polarized light lens. PC polarized lenses are mass produced, and require several days of working hours. Further, drawbacks of polarizing color shifts, stress marks and impurities are likely caused at a joining surface of the base plate with the PC in the high-temperature mold of the injection molding machine. Further, uneven colors and water marks may also be generated in the coloring step. These defects can only be found at the final inspection step, leading to a lower yield rate of finished products. Thus, the manufacturing process of conventional PC polarized lenses is not only time-consuming but also has increased costs due to a low yield rate.

A manufacturing process of a resin polarized lens is taken as an example. A shaping process is performed on a polarizing film (to be referred to as a base plate). Steps of injecting and manufacturing a rubber ring, and grinding and cleaning a glass mold are performed. A mold closing step is performed on the base plate and the glass mold. After pouring, the mold is heated in a curing oven, and hardening and joining are then completed after a long reaction time. Next, a first inspection operation is performed, followed by performing steps of cleaning, coloring and reinforcing. A second inspection operation is then performed. Resin polarizing lenses are also mass produced, and require several days of working hours that are even longer than the manufacturing process of PC polarizing lenses. Further, the yield rate of resin polarizing lenses is not effectively increased in comparison. Thus, resin polarizing lenses also consume large production costs as expected. Therefore, there is a need for developers, researchers and manufactures of lenses with other additional optical effects to provide for a solution that effectively increases the yield rate of a manufacturing process of lenses with other additional optical effects, so as to achieve advantages of attaching the master slice and the base plate with no bubbles in between, optimal wrinkle-free attaching effects and outstanding optical properties.

SUMMARY OF THE INVENTION

In view of the drawbacks of the manufacturing process and actual applications of lenses with other additional optical effects, the present invention is directed to a method for processing a lens film.

The primary object of the present invention is to provide a processing method for a lens film, and more particularly to a processing method for attaching a film having optical properties onto a surface of a lens. In the present invention, a master slice has a surface formed with a microstructure during a cleaning process, and is pressed with a base plate having a curvature in a mold to form a lens with optical properties, thereby achieving advantages of attaching the master slice and the base plate with no bubbles in between, optimal wrinkle-free attaching effects and outstanding optical properties.

To achieve the above object, the present invention provides a processing method for a lens film. The lens at least includes a master slice and a base plate. The processing method for a lens film includes steps of: performing a shaping process on the base plate to form a curvature; forming a microstructure on a surface of the master slice by a cleaning process; positioning and placing the base plate and the master slice in a mold, wherein the mold at least includes an upper mold and a lower mold, a lower end portion of the upper mold and an upper end portion of the lower mold are joined in a corresponding protruding/recessed manner, and the base plate and the master slice are placed between the upper mold and the lower mold; applying a fixed amount of adhesive between the base plate and the master slice; pressing the base plate and the master slice by the mold to form a lens; and performing a curing process on the lens to complete the processing of the lens film.

Accordingly, in the processing method for a lens film of the present invention, a microstructure is formed on the surface of the master slice by multiple steps of the cleaning process, and the master slice is then pressed with the base plate having a curvature to form a lens with optical effects, thereby achieving the advantages of attaching the master slice and the base plate with no bubbles in between, optimal wrinkle-free attaching effects and outstanding optical properties. Further, the processing method for a lens film of the present invention is applicable to a master slice structure made of various materials to effectively eliminate a processing method of mass production of conventional PC polarizing lenses or resin polarizing lenses that consumes long working hours, hence achieving the object of reducing long working hours by automated production as well as effectively enhancing the yield rate for diversified products to above 90%. Further, in the processing method for a lens film of the present invention, the steps of pressing the mold and applying ultraviolet light or thermal curing allow the fixed amount of adhesive located at the master slice or the base plate to be evenly distributed between the master slice and the base plate to reinforce the joining strength between the master slice and the base plate.

DETAILED DESCRIPTION OF THE PREFERRED EMBODIMENTS

The object and advantages of structural designs and functions of the present invention will become better understood with regard to the following detailed description of the preferred but non-limiting embodiments. The following description is made with reference to the accompanying drawings.

Figure 1:
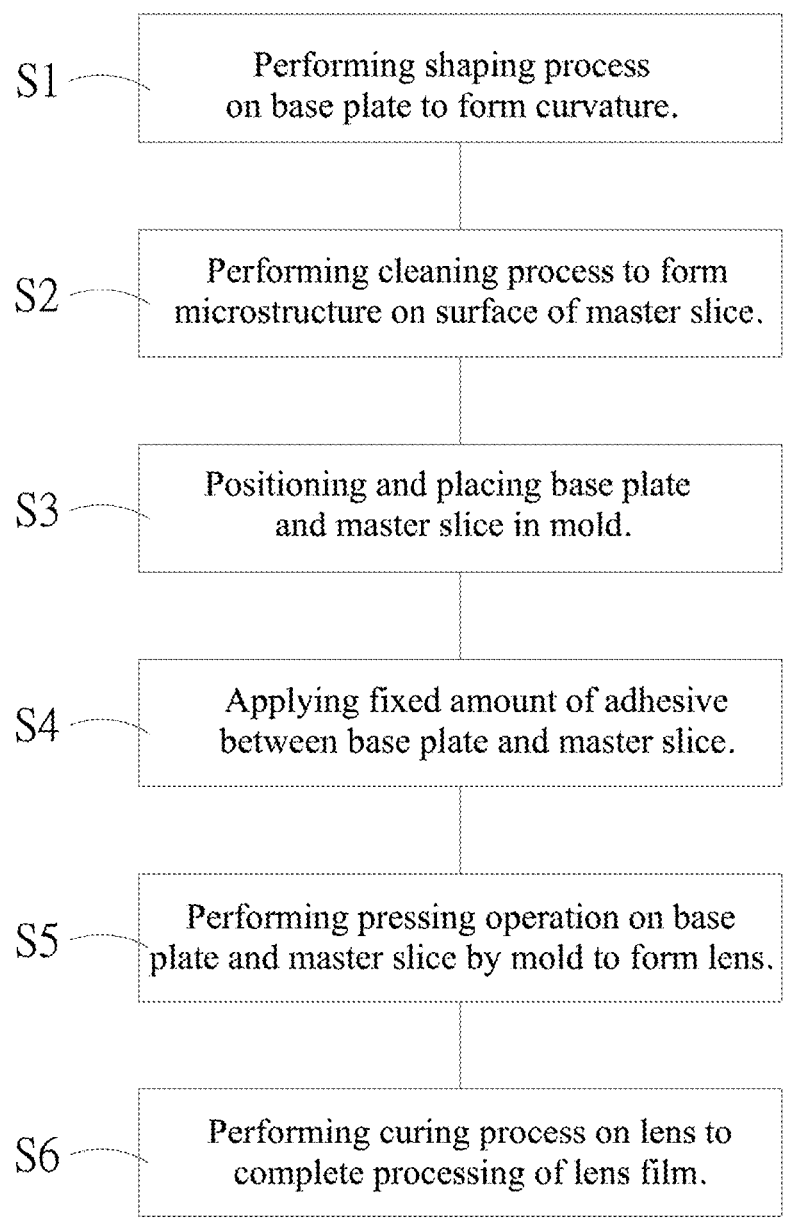
FIG. 1 is a flowchart of steps of a processing method for a lens film of the present invention.
Figure 2:
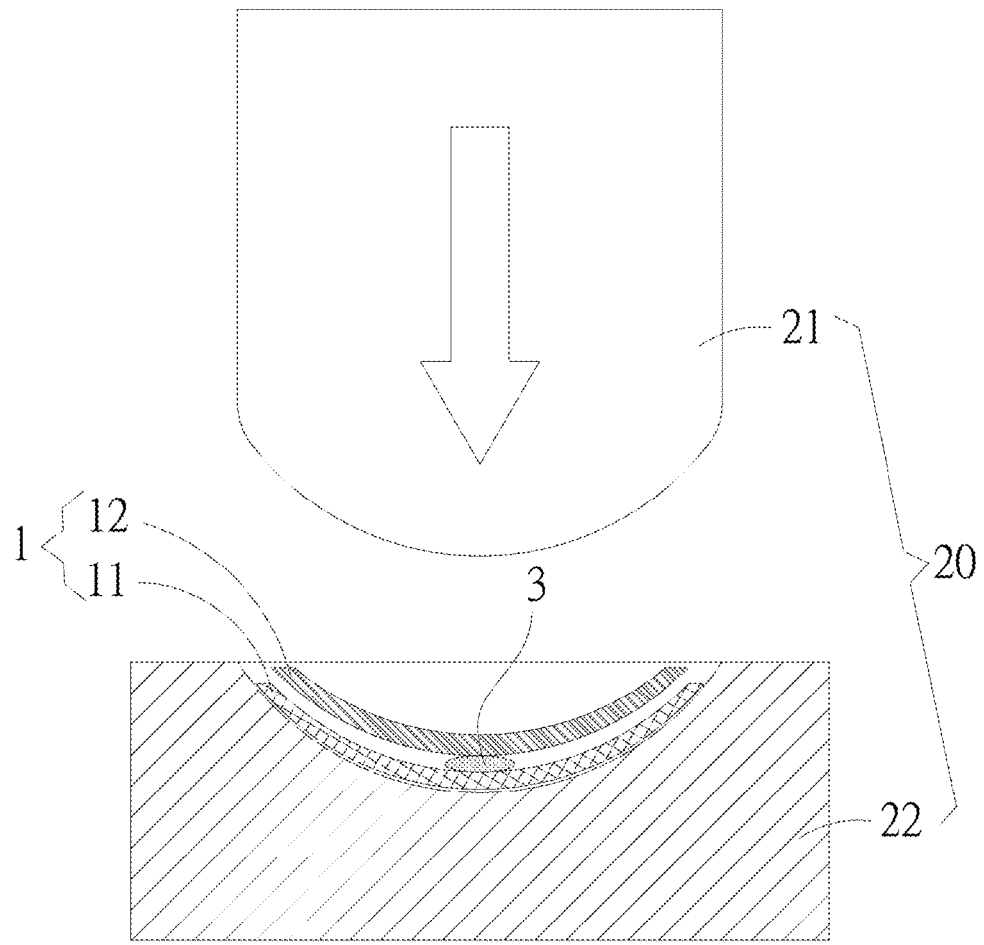
FIG. 2 is a schematic diagram of pressing a mold in a processing method for a lens film according to a preferred embodiment of the present invention.

FIG. 1 and FIG. 2 show a flowchart of steps of a processing method and a schematic diagram of pressing a mold in a processing method for a lens film according to a preferred embodiment of the present invention, respectively. Referring to FIG. 1 and FIG. 2, a lens (1) at least includes a master slice (11) and a base plate (12). The processing method for a lens film of the present invention includes following steps.

In step 1 (S1), a shaping process is performed on the base plate (12) to form a curvature for the base plate (12). The shaping process performed on the base plate (12) is one method of hot pressing forming, hot pressing extension forming, vacuum suction baking forming, heating ball blowing forming and wet extension forming that causes the base plate (12) to have a curvature. In one preferred embodiment of the present invention, the base plate (12) is an optical film structure (e.g., a polarizing film, a color-changing film or an anti-blue-ray film).

In step 2 (S2), a cleaning process is performed to form a microstructure on a surface of the master slice (11). The master slice (11) is formed by one material of resin (more specifically, Colombia resin 39, also known as polyallyl diglycol carbonate), acrylic (also known as polymethyl methacrylate), glass, and polycarbonate (PC). In one preferred embodiment of the present invention, the cleaning process is includes performing alkali washing on the master slice (11) by an alkaline solution (e.g., sodium hydroxide (NaOH) or potassium hydroxide (KOH)), performing acid washing on the master slice (11) by an acidic solution (e.g., hydrochloric acid (HCl) or sulfuric acid ($H_2SO_4$)), cleaning the master slice (11) by a cleaning agent, soaking the master slice (11) in hot water and lifting the master slice (11) to dehydrate the master slice (11), baking the master slice (11) by an oven to remove water vapor of the surface of the master slice (11), and performing an electric corona process to form the microstructure on the surface of the master slice (11). The microstructure is for reinforcing the binding strength between the master slice (11) and the base plate (12). In one preferred embodiment of the present invention, the electric corona process is for manufacturing the microstructure on the surface of the master slice (11), and the cleaning process is completed in an ultrasonic device.

In step 3 (S3), the base plate (12) and the master slice (11) are positioned and placed in a mold (2). The mold (2) at least includes an upper mold (21) and a lower mold (22). A lower end portion of the upper mold (21) and an upper end portion of the lower mold (22) are joined in a corresponding protruding/recessed manner. The base plate (12) and the master slice (11) are placed between the upper mold (21) and the lower mold (22).

In step 4 (S4), a fixed amount of adhesive (3) is applied between the base plate (12) and the master slice (11). In one preferred embodiment of the present invention, the fixed amount of adhesive (3) is applied on the master slice (11) or the base plate (12) to effectively control the binding strength between the base plate (12) and the master slice (11).

In step 5 (S5), a pressing operation is performed on the base plate (12) and the master slice (11) by the mold (2) to form a lens (1). Again referring to FIG. 2 showing a schematic diagram of pressing the mold, the upper mold (21) of the mold (2) is pressed towards the direction of the lower mold (22) by an external force. As the upper mold (21) and the lower mold (22) are joined in a corresponding protruding/recessed manner, the upper mold (21) is capable of joining the base plate (12) and the master slice (11) placed between the upper mold (21) and the lower mold (22). Further, with the fixed amount of adhesive (3) applied between the base plate (12) and the master slice (11), the pressing of the mold (2) allows the adhesive (3) to be distributed and applied evenly between the base plate (12) and the master slice (11) for better binding effects. Further, before the pressing operation on the master slice (11) and the base plate (12) in step 5 (S5), the mold (2) placed with the master slice (11) and the base plate (12) is placed in a vacuum container (not shown), hence achieving an object of de-bubbling. The pressure of the vacuum container reaches between −1 psi to −14 psi within 60 seconds, whereas 14.7 psi is an atmospheric pressure (atm). Further, the pressure of the pressing operation on the mold (2) is between 500 kg and 3000 kg.

In step 6 (S6), a curing process is performed on the lens (1) to complete the processing of the lens (1) film. The curing process is one of ultraviolet curing and thermal curing, and is performed for a period between 1 minute and 15 minutes, so as to effectively cure the adhesive (3) and reinforce the binding effect between the master slice (11) and the base plate (12).

After the curing process of step 6 (S6), a trimming operation may further be performed on the lens (1). The trimming operation may be completed by one of a cutting tool and a grinding tool.

To allow one person skilled in the art to better understand the object, characteristics and expected functions of the present invention, an actual example of the processing method for a lens film is given in an embodiment below to further illustrate the scope of the present invention. It should be noted that, details of the embodiment below are not to be construed as limitations in any form on scope of the present invention.

When a lens (1) has a requirement of an additional optical effect, e.g., when the lens (1) is to be attached by a polarizing film to reinforce the clarity of vision to obtain a better visual quality, a shaping process is performed on the base plate (12) of a polarizing film to form a curvature on the base plate (12). For example, the shaping processing on the base plate (12) of the polarizing film may be completed by one method of hot pressing forming, hot pressing extension forming, vacuum suction baking forming, heating ball blowing forming and wet extension forming, to cause the base plate (12) to have a curvature. A cleaning process is performed to form a microstructure on a surface of the master slice (11). The master slice (11) is formed by one material of resin, acrylic, glass and PC. The cleaning process includes performing alkali washing on the master slice (11) by an alkaline solution (e.g., NaOH or KOH), performing acid washing on the master slice (11) by an acidic solution, cleaning the master slice (11) by a cleaning agent, soaking the master slice (11) in hot water and lifting the master slice (11) to dehydrate the master slice (11), baking the master slice (11) by an oven to remove water vapor of the surface of the master slice (11), and performing an electric corona process to form the microstructure on the surface of the master slice (11). The microstructure is for reinforcing the joining strength between the master slice (11) and the base plate (12), and the cleaning process is completed in an ultrasonic device. The base plate (12) and the master slice (11) are positioned and placed in a mold (2). The mold (2) at least includes an upper mold (21) and a lower mold (22). A lower end portion of the upper mold (21) and an upper end portion of the lower mold (22) are joined in a corresponding protruding/recessed manner. The base plate (12) and the master slice (11) are placed between the upper mold (21) and the lower mold (22). A fixed amount of adhesive (3) is applied between the base plate (12) and the master slice (11). The fixed amount of adhesive (3) is applied on the master slice (11) or the base plate (12) (not shown) to effectively control the joining strength between the base plate (12) and the master slice (11). The mold (2) placed with the master slice (11) and the base plate (12) is placed in a vacuum container, hence achieving an object of de-bubbling between the master slice (11) and the base plate (12). The pressure of the vacuum container reaches between −1 psi to −14 psi within 60 seconds. In the vacuum container, a pressing operation is performed on the base plate (12) and the master slice (11) by the mold (2) to form a lens (1). The pressing operation is pressing the upper mold (21) of the mold (2) towards the direction of the lower mold (22) by an external force. As the upper mold (21) and the lower mold (22) are joined in a corresponding protruding/recessed manner, the upper mold (21) is capable of joining the base plate (12) and the master slice (11) placed between the upper mold (21) and the lower mold (22). Further, with the fixed amount of adhesive (3) applied between the base plate (12) and the master slice (11), the pressing of the mold (2) allows the adhesive (3) to be distributed and applied evenly between the base plate (12) and the master slice (11) for better binding effects. Further, the pressure of the pressing operation on the mold (2) is between 500 kg and 3000 kg. Next, a curing process is performed on the lens (1) to complete the processing of the lens (1) film. The curing process is one of ultraviolet curing and thermal curing, and is performed for a period between 1 minute and 15 minutes, so as to effectively cure the adhesive (3) and reinforce the binding effect between the master slice (11) and the base plate (12). As such, the processing method for a lens film of the present invention is complete to achieve advantages of attaching the master slice and the base plate with no bubbles in between, optimal wrinkle-free attaching effects and outstanding optical properties. It is known from the above embodiments that, the processing method for a lens film of the present invention provides following advantages compared to the prior art.

1. In the processing method for a lens film of the present invention, a microstructure is formed on the surface of the master slice by multiple steps of the cleaning process, and the master slice is then pressed with the base plate having a curvature in a mold to form a lens with optical effects, thereby achieving the advantages of attaching the master slice and the base plate with no bubbles in between, optimal wrinkle-free attaching effects and outstanding optical properties.

2. The processing method for a lens film of the present invention is applicable to a master slice structure made of various materials to effectively eliminate a processing method of mass production of conventional PC polarizing lenses or resin polarizing lenses that consumes long working hours, hence achieving the object of reducing long working hours by single-piece production approach as well as effectively enhancing the yield rate for diversified products to above 90%.

3. In the processing method for a lens film of the present invention, the steps of pressing the mold and applying ultraviolet light or thermal curing allow the fixed amount of adhesive located at the master slice or the base plate to be evenly distributed between the master slice and the base plate. Thus, not only the thickness of the lens formed by the master slice and the base plate joined can be effectively controlled, but also the joining strength between the master slice and the base plate can be reinforced.

In conclusion, the processing method for a lens film of the present invention achieves expected effects with the embodiments disclosed.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A processing method for a lens film, a lens at least comprising a master slice and a base plate, the processing method for a lens film comprises steps of:
   Step 1: performing a shaping process on the base plate to form a curvature for the base plate;
   Step 2: performing a cleaning process to form a microstructure on a surface of the master slice;
   Step 3: positioning and placing the base plate and the master slice in a mold, wherein the mold at least comprises an upper mold and a lower mold, a lower end portion of the upper mold and an upper end portion of the lower mold are joined in a corresponding protruding/recessed manner, and the base plate and the master slice are placed between the upper mold and the lower mold;
   Step 4: applying a fixed amount of adhesive between the base plate and the master slice;
   Step 5: performing a pressing operation on the base plate and the master slice by the mold to form the lens; and
   Step 6: performing a curing process on the lens to complete the processing of the lens film,
      wherein the cleaning process comprises performing alkali washing on the master slice by an alkaline solution, performing acid washing on the master slice by an acidic solution, cleaning the master slice by a cleaning agent, soaking the master slice in hot water and lifting the master slice to dehydrate the master slice, baking the master slice by an oven to remove water vapor on the surface of the master slice, and performing an electric corona process to form the microstructure on the surface of the master slice.

2. The processing method for a lens film according to claim 1, wherein the shaping process is one method of hot pressing forming, hot pressing extension forming, vacuum suction baking forming, heating ball blowing forming, and wet extension forming.

3. The processing method for a lens film according to claim 1, wherein the alkaline solution is selected from NaOH or KOH.

4. The processing method for a lens film according to claim 3, wherein the acidic solution is selected from hydrochloric acid (HCl) or sulfuric acid ($H_2SO_4$).

5. The processing method for a lens film according to claim 1, wherein the acidic solution is selected from hydrochloric acid (HCl) or sulfuric acid ($H_2SO_4$).

6. The processing method for a lens film according to claim 1, wherein the fixed amount of adhesive is applied on the master slice or the base plate.

7. The processing method for a lens film according to claim 1, before the step of performing the pressing operation on the master slice and the base plate, further comprising:
   placing the mold placed with the master slice and the base plate in a vacuum container, wherein a pressure of the vacuum container reaches between −1 psi to −14 psi within 60 seconds.

8. The processing method for a lens film according to claim 1, wherein a pressure of the pressing operation is between 500 kg and 3000 kg.

9. The processing method for a lens film according to claim 1, wherein the curing process is one of ultraviolet curing or thermal curing, and a period of the curing process is within 15 minutes.

10. The processing method for a lens film according to claim 1, after step 6 of performing the curing process, further comprising performing a trimming operation on the lens.

* * * * *